United States Patent
Ramesh et al.

(10) Patent No.: US 6,395,860 B1
(45) Date of Patent: May 28, 2002

(54) CLEARCOAT COMPOSITION WITH IMPROVED SCRATCH AND MAR RESISTANCE

(75) Inventors: Swaminathan Ramesh, Canton; Manoj K. Gupta, Troy, both of MI (US)

(73) Assignee: BASF Corporation, Springfield, MI (US)

( * ) Notice: Subject to any disclaimer, the term of this patent is extended or adjusted under 35 U.S.C. 154(b) by 0 days.

(21) Appl. No.: 09/669,587

(22) Filed: Sep. 26, 2000

(51) Int. Cl.$^7$ .............................................. C08G 18/10
(52) U.S. Cl. ...................... 528/59; 528/81; 252/182.22; 560/26; 560/115
(58) Field of Search ................ 528/59, 81; 252/182.22; 560/26, 115

(56) References Cited

U.S. PATENT DOCUMENTS

| | | |
|---|---|---|
| 4,745,212 A | 5/1988 | Mormann et al. |
| 5,096,994 A | 3/1992 | Schmalstieg et al. |
| 5,418,301 A | 5/1995 | Hult et al. |

*Primary Examiner*—Rachel Gorr
(74) *Attorney, Agent, or Firm*—Anna M. Budde

(57) ABSTRACT

The polyisocyanate ester compound is a branched material having at least two ester linkages, at least four urethane linkages further from the center of the compound compared to the ester linkages, and at least one terminal isocyanate group for each urethane linkage, which isocyanate group may be blocked. The compound can be prepared by first by reacting a polyol compound having at least two hydroxyl groups with a carboxylic acid compound having one carboxylic acid group and at least two hydroxyl groups to form a hydroxyl-functional ester product. The hydroxyl-functional ester product is then reacted with a polyisocyanate compound in which the isocyanate groups have different reactivities. The reaction with the polyisocyanate compound is carried out under conditions so that only one of the isocyanate groups is substantially reactive with the hydroxyl groups of the ester product of the first stage.

30 Claims, No Drawings

CLEARCOAT COMPOSITION WITH IMPROVED SCRATCH AND MAR RESISTANCE

FIELD OF THE INVENTION

The present invention is directed to curable coating compositions. More specifically, the invention concerns coating compositions including polyisocyanate crosslinkers.

BACKGROUND OF THE INVENTION

Curable, or thermosettable, coating compositions are widely used in the coatings art, particularly for topcoats in the automotive and industrial coatings industry. Coating compositions including melamine crosslinkers provide good resistance to scratch and mar, but coatings cured with melamine crosslinkers have poorer resistance to environmental etch. "Environmental etch" is a term applied to a kind of exposure degradation that is characterized by spots or marks on or in the finish of the coating that often cannot be rubbed out. On the other hand, isocyanate-functional crosslinking agents provide excellent resistance to environmental etch but are less desirable because of poorer scratch and mar and higher viscosity.

The average degree of functionality of the polyisocyanate crosslinkers is of considerable importance in the production of high-quality coatings. In general, the higher the average functionality, the higher the crosslink density that develops in the coating during cure and the higher its resistance to environmental etch. Typical polyisocyanates crosslinkers used in coating compositions are biurets, isocyanurates, and oligomers of diisocyanates that provide about three isocyanate groups for crosslinking. These polyisocyanates provide excellent resistance to environmental etch in cured coatings, but the coatings do not have the desired scratch and mar resistance.

Schmalstieg et al., U.S. Pat. No. 5,096,994, discloses polyisocyanates prepared by reacting a monoisocyanatocarboxylic acid chloride with a silylated polyol. The dendrimers disclosed reportedly offer increased solids content over isocyanurate-based coating compositions, but the synthesis results in a chlorinated by-product that must be removed. Residual chlorine in the reaction product or as a by-product impurity is problematic in coating compositions for a number of reasons, and so special steps must be taken in preparing the polyisocyanates of the '994 patent, including using an excess of the silylated polyol and carefully removing all of the chlorinated by-product. In addition, the monomers used for this preparation of the Schmalstieg polyisocyanates are expensive to prepare.

Hult et al., U.S. Pat. No. 5,418,301, describes preparing a dendritic polyester by reacting an initiator molecule with at least one hydroxyl group with a chain extender molecule having a carboxylic acid group and two hydroxyl groups. Optionally, the terminal hydroxyl groups of the dendrite can be reacted with a chain stopper, such as a monofunctional carboxylic acid or a diisocyanate or oligomer of a diisocyanate, which further extends the dendritic polyester. For example, the '301 patent provides an example in which the hydroxyl-functional dendritic polyester was used to prepare a polyurethane having no free isocyanate groups. The '301 patent does not describe preparing polyisocyanates.

It would be advantageous to have a polyisocyanate crosslinking agent that in addition to the environmental etch resistance available from polyisocyanate crosslinkers, provide improved scratch and mar resistance of the coating without dramatically increasing the viscosity of the coating composition. It would also be advantageous to prepare a polyisocyanate crosslinking agent from less expensive materials and materials more readily available in the coating industry.

SUMMARY OF THE INVENTION

Accordingly, it is an object of the present invention to provide polyisocyanate compounds with increased functionality useful as crosslinking agents in coating compositions. Coating compositions based on the polyisocyanate compound crosslinkers of the invention exhibit marked improvement in scratch and mar resistance.

The polyisocyanate ester compound is a branched material having at least two ester linkages, at least four urethane linkages further from the center of the compound compared to the ester linkages, and at least one terminal isocyanate group for each urethane linkage, which isocyanate group may be blocked. The polyisocyanate compound is prepared first by reacting a polyol compound having at least two hydroxyl groups with a carboxylic acid compound having one carboxylic acid group and at least two hydroxyl groups to form a hydroxyl-functional ester product. The hydroxyl-functional ester product may have more than one ester linkage on average for each hydroxyl group of the polyol compound by reacting more than one carboxylic acid equivalent of the carboxylic acid compound, based on equivalents of hydroxyl of the polyol compound. The reaction of the excess may be carried out in one step, with all of the carboxylic acid compound introduced into the reactor initially. Alternatively may be carried out in a stepwise manner, for example by initially reacting one equivalent of carboxylic acid per polyol hydroxyl equivalent until the reaction is substantially complete and then reacting an additional amount of the carboxylic acid compound with the initial ester product to form the ester product of the first stage.

The hydroxyl-functional ester product is then reacted with a diisocyanate compound in which the isocyanate groups have different reactivities. The reaction with the diisocyanate compound is carried out under conditions so that only one of the isocyanate groups is reactive with the hydroxyl groups of the ester product of the first stage. Because each of the isocyanate is monofunctional under the reaction conditions, the product avoids building viscosity. In this way, a highly-functional isocyanate crosslinker can be used for the coating composition without the increase in viscosity experienced with polyisocyanate crosslinkers of the prior art. The polyisocyanate crosslinkers of the invention are prepared from materials that are relatively inexpensive compared with the isocyanatocarboxylic acid chloride/silylated polyol synthesis of the prior art and are prepared in a reaction that does not result in chlorinated products or impurities. The coating compositions prepared from the polyisocyanate crosslinkers of the invention have reduced volatile organic content and produce coatings with improved resistance to scratch and mar.

DETAILED DESCRIPTION OF THE INVENTION

The present invention provides a poly-functional isocyanate compound. The compound may be formed through the esterification of a polyol with a monocarboxylic acid compound having at least two hydroxyl groups to form a hydroxyl-functional ester compound, followed by reaction of the hydroxyl groups of the ester compound with a diisocyanate compound in which the isocyanate groups have different reactivities to provide a polyisocyanate ester compound having a ester linkages closest to the polyol core with urethane linkages further from the core than the ester linkages. Preferably, there are from about two to about six ester linkages between any two urethane linkages.

The polyol is a compound that has at least two hydroxyl groups. The preferred polyol will have more than two hydroxyl groups, and preferably will have from about 3 to about 8 hydroxyl groups. The polyol may be an aliphatic, cycloaliphatic, or aromatic diol, triol, tetrol, or a sugar or sugar alcohol and may contain from two to about eight hydroxyl groups. Polyhydroxy-functional polymers are not polyol compounds according to the invention; "compound" refers to non-polymeric materials.

Examples of suitable diol compounds include, without limitation, 1,3-propanediol, 1,2-ethanediol, 1,4-butanediol, 1,5-pentanediol, 1,6-hexanediol, dimethylolpropane, neopentyl glycol, 2-propyl-2-methyl-1,3-propanediol, 2-butyl-2-ethyl-1,3-propanediol, 2,2-diethyl-1,3-propanediol, 1,2-propanediol, 1,3-butanediol, 2,2,4-trimethylpentane-1,3-diol, trimethylhexane-1,6-diol, 2-methyl-1,3-propanediol, diethylene glycol, triethylene glycol, dipropylene glycol, tripropylene glycol, cycloaliphatic diols such as cyclohexane dimethanol, 3-dioxane-5,5-dimethanol, aromatic diols such as, 4-xylylene glycol, 1-phenyl-1,2-ethanediol, Bisphenol A, hydroquinone, and resorcinol, as well as combinations of these. Examples of suitable triol compounds include, without limitation, trimethylolpropane, trimethylolethane, trimethylolbutane, 3,5,5-trimethyl-2,2-dihydroxymethylhexane- 1-ol, glycerol, 1,2,6-hexane triol, and combinations of these. Examples of suitable tetrol compounds include, without limitation, pentaerythritol, ditrimethylolpropane, diglycerol and ditrimethylolethane, and combinations of these. Examples of suitable sugar or sugar alcohol compounds include, without limitation, sugar or sugar alcohols such as mannitol, sorbitol, formitol, fructose, glucose, sucrose, lactose and any other sugars or sugar alcohols containing from about four to about eight hydroxyl groups per molecule and combinations of these. Preferred polyol compounds include trimethylolpropane and pentaerythritol.

The polyol is esterified with a monofunctional carboxylic acid compound having at least two hydroxyl groups. Preferably, the carboxylic acid compound has more than two hydroxyl groups, more preferably from about 2 to about 5 hydroxyl groups. Suitable examples of the monocarboxylic acid compound with hydroxyl groups include, without limitation, α,α-bis(hydroxymethyl)-propionic acid (dimethylolpropionic acid), α,α-bis-(hydroxymethyl)-butyric acid, α,α,α, tri(hydroxymethyl)-acetic acid, α,α-bis(hydroxymethyl)-valeric acid, α,α-bis(hydroxy)propionic acid, α-phenylcarboxylic acids having at least two hydroxyl groups directly pendant to the phenyl ring (phenolic hydroxyl groups) such as 3,5-dihydroxybenzoic acid, and combinations of these. Aliphatic compounds, particularly dimethylolpropionic acid, are preferred, especially if the compound is used as a crosslinker in automotive topcoat coating compositions (including basecoat and clearcoat coating compositions).

The monocarboxylic acid compound having at least two hydroxyl groups is preferably reacted with the polyol compound in a ratio of at least about one equivalent of acid from the monofunctional carboxylic acid compound for each equivalent of hydroxyl of the polyol compound, preferably about one equivalent of acid for each equivalent of hydroxyl of the polyol. The esterification reaction may be carried out under typical conditions for such reactions. A catalyst, for example an acid catalyst such as sulfuric acid, p-toluene sulfonic acid, trifluoromethane sulfonic acid, phosphoric acid, dry hydrogen chloride, tin tetrachloride, aluminum trichloride, and boron trifluoride; a cationic exchange resin, a titanate such as tetrabutyl titanate, or a tin catalyst such as dibutyl tin oxide may be used. The reaction may be carried out as in a melt or as a solution in an unreactive solvent. For example toluene, xylene, naphtha, a ketone solvent, or an ester solvent, may be used as a reaction medium. Typical esterification reaction temperatures are in the range of 140–160° C. The water by-product is usually removed to drive the reaction to the ester product.

In one embodiment, the monofunctional carboxylic acid compound is included at an excess, so the ratio of equivalents of carboxylic acid to hydroxyl equivalents from the polyol compound is more than one to one, preferably from about 1.5 to about 2 equivalents of acid from the carboxylic acid compound for each equivalent of hydroxyl of the polyol compound. The hydroxyl-functional ester product then has more than one ester linkage on average for each hydroxyl group of the polyol compound. The reaction of the excess may be carried out in one step, with all of the carboxylic acid compound introduced into the reactor initially. Alternatively may be carried out in a stepwise manner, for example by initially reacting one equivalent of carboxylic acid per polyol hydroxyl equivalent until the reaction is substantially complete and then reacting an additional amount of the carboxylic acid compound with the initial ester product to form the ester product of the first stage.

The extent of reaction can be monitored by acid number titration, infrared spectroscopy, or by the amount of water by-product collected during synthesis. Typically, the reaction of the polyol compound and the acid compound is carried out to substantial completion, from about 90 to about 95% of theoretical completion. The resulting hydroxyl-functional ester compound product typically has a polydispersity of about 1.3 to about 1.8.

The hydroxyl-functional ester compound is reacted with a diisocyanate compound in which the isocyanate groups have different reactivities. Under the reaction conditions essentially only one of the isocyanate groups of the polyisocyanate compound reacts. The rate of reaction of the remaining isocyanate group or groups is low enough so that the remaining isocyanate groups either do not react or essentially do not react. By "essentially do not react" we mean that the extent of reaction of the remaining isocyanate groups is essentially nil, and less than about 5%, preferably less than about 1%, of the urethane bonds formed involve a second isocyanate group of the polyisocyanate compound. In order for one of the isocyanate groups to be markedly more reactive under the reaction conditions such that the isocyanate is essentially monofunctional in the reaction with the ester compound, the isocyanate groups of the polyisocyanate compound must be dissimilar. Examples of suitable polyisocyanate compounds include, without limitation, 2,3-toluene diisocyanate, 2,4-toluene diisocyanate, 2,5-toluene diisocyanate, the 2,3-, 2,4-, and 2,5-isomers of hexahydrotoluene diisocyanate, isophorone diisocyanate, 1-methoxyphenyl-2,4-diisocyanate, and combinations of these. Preferred polyisocyanates include isophorone diisocyanate and 2,4-toluene diisocyanate.

The ester compound and the isocyanate are reacted in an equivalent ratio of about one equivalent of hydroxyl groups of the ester compound to at least one equivalent of the isocyanate group that has higher reactivity under the reaction conditions. An excess of the isocyanate compound may be used, but then it is usually desirable to remove the unreacted excess in an additional step.

The reaction proceeds with or without a catalyst and under temperature conditions, solvent and purge/vacuum conditions that maintain the difference in isocyanate group reactivities. Specific conditions for any particular polyisocyanate can be determined from the literature or by straightforward experimentation. The reaction can be followed in the usual manner, for example by titration of unreacted isocyanate or hydroxyl groups or by infrared spectroscopy. Each hydroxyl group of the ester compound forms a urethane group in the polyisocyanate ester product. The polyisocyanate can be used in stoichiometric excess, with unreacted polyisocyanate being removed, for example by vacuum distillation, after the reaction.

The polyisocyanate ester compound in general is a dendrite structure having, moving from the core outward, an ester linkage at a first branch point closest to the core and optionally further branch points having ester linkages further from the core, with a urethane linkage beyond the last ester branch point. The isocyanate groups are at the ends of the dendrite branches.

The polyisocyanate ester compound may be used in a thermosetting coating composition as a crosslinker. The coating composition of the invention includes at least one resin or polymer having functionality reactive with isocyanate groups. The polymer or resin included in the coating composition along with the polyisocyanate ester compound may be any of those having isocyanate-reactive functional groups. Suitable examples of isocyanate-reactive functional groups include, without limitation, active hydrogen groups such as hydroxyl groups, primary and secondary amine groups, mercaptan groups, primary or secondary carbamate groups, and so on. Suitable examples of types of polymer or resin that can be included in the coating composition of the invention and used with the crosslinker of the invention include, without limitation, acrylic polymers, polyurethanes, polyesters, epoxy resins, and others having these functional groups.

The coating composition may further include more than one resin or polymer and/or further curing agents. Examples of materials suitable as further curing agents include, without limitation, other polyisocyanate compounds and aminoplast resins, including melamine-formaldehyde resins. In one embodiment, the polyisocyanate ester compound of the invention is included in a coating composition along with one or more additional isocyanate-functional curing agents. Any of the usual polyisocyanate crosslinkers can be included, for example, and without limitation, diisocyanates, triisocyanates, and isocyanurates, biurets, and allophanates of diisocyanates. Examples of preferred further polyisocyanate crosslinkers include, without limitation, the isocyanurate of isophorone diisocyanate, the isocyanurate of hexamethylene diisocyanate, and combinations of these. The polyisocyanate ester compound of the invention should be at least about 10% by weight of the total isocyanate-functional curing agent weight, preferably at least about 15% by weight of the total isocyanate-functional curing agent weight. The polyisocyanate ester compound of the invention preferably may be used in amounts of from about 10% by weight to about 50% by weight, more preferably from about 15% by weight to about 25% by weight of the total weight of the isocyanate-functional curing agents.

In certain coating compositions, it is preferred to block the isocyanate groups of the curing agent. Blocked isocyanate compounds are known in the art and typically used in thermosetting coating compositions when it desired that the isocyanate group be unreactive with the isocyanate-reactive components of the coating composition until the composition is heated to a temperature at which the blocking agent compound unblocks and volatilizes. The isocyanate group is then free to react and curing takes place. Thus, one-component (one-package) systems typically employ blocked isocyanate crosslinkers, while unblocked isocyanate crosslinkers are employed for two-component (two-package) coating composition with the crosslinker and reactive polymer stored separately and mixed just prior to use. Suitable blocking agents include, without limitation, lower monohydric alcohols, especially alcohols having up to eight carbons, particularly secondary or tertiary alcohols such as isopropanol or tert-butanol, ethylene glycol monobutyl ether, diethylene glycol monobutyl ether; hydroxylamines; C—H-acidic compounds such as malonic acid dialkyl esters, acetylacetone or acetoacetic acid alkyl esters, and malonic acid derivatives such as malonic acid diethyl ester; oximes such as formaloxime, acetaldoxime, methyl ethyl ketoxime, methyl amyl ketoxime, cyclohexanone oxime, acetophenone oxime, benzophenone oxime or diethyl glycoxime; secondary aromatic amines such as N-methyl aniline, N-methyl toluidine, N-phenyl toluidine and N-phenyl xylidine; lactams such as $\epsilon$-ccaprolactam or $\delta$-valerolactam; phenolic compounds such as phenol, cresols, trimethylphenols, tert-butyl phenol or nonyl phenol; amides, such as succinamide; N-alkyl amides such as N-methyl acetamide; imides such as phthalimide; imidazoles such as benzimidazole; triazoles such as benzotriazole and tolyltriazole; alkali metal bisulphites; mercaptans such as octyl mercaptan, 2-mercaptobenthiazole, $\alpha$-naphthyl mercaptan and dodecyl mercaptan; and pyrazoles such as pyrazole, 3,5-dimethylpyrazole, 3-methylpyrazole, 4-nitro-3,5-dimethylpyrazole and 4-bromo-3,5-dimethylpyrazole.

The coating composition may also include other materials, such as pigments, fillers, solvents, and additives such as catalysts, flow agents such as rheology control agents, hindered amine light stabilizers, wetting agents, dispersing agents, and ultraviolet absorbers. The pigment may be any organic or inorganic compounds or colored materials, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1).

The coating composition used in the practice of the invention may include a catalyst to enhance the cure reaction between the polyisocyanate ester compound and the isocyanate-reactive resin or polymer of the coating composition. Suitable catalysts for isocyanate reactions are well-known and include, without limitation, dibutyl tin oxide, dibutyl tin dilaurate, dibutyl tin diacetate, DABCO (1,4-diazobicyclo[2.2.2]octane), and so on.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to the components of the composition. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents. In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent. The isocyanate ester compound should be blocked if used in a solvent medium having active hydrogen solvents, such as water or alcohols.

Coating compositions can be coated on the article by any of a number of techniques well-known in the art. These include, for example, spray coating, dip coating, roll coating, curtain coating, and the like. For automotive body panels, spray coating is preferred. The coating is then cured at temperatures of room temperature for unblocked isocyanate compounds to 160° C. or more when the isocyanate groups are blocked. The resulting coating exhibits superior solvent, scratch, and mar resistance.

The coating composition according to the invention is preferably utilized in a high-gloss coating and/or as the clearcoat of a composite color-plus-clear coating. High-gloss coatings as used herein are coatings having a 20° gloss (ASTM D523) or a DOI (ASTM E430) of at least 80.

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. The types of coatings for which the crosslinker of the invention is useful include a clearcoat over a basecoat, a basecoat, a topcoat, an primer and an electrocoat primer.

The coating can be used on various substrates, including metal substrates or plastic substrates, especially automotive vehicle bodies.

The invention is further described in the following examples. The examples are merely illustrative and do not in any way limit the scope of the invention as described and claimed. All parts are parts by weight unless otherwise noted.

EXAMPLE 1
Polyisocyanate Ester Compound

A 1-liter reactor equipped with an agitator, straight reflux condenser, thermometer, and variable heat source was charged with 67 g trimethylolpropane, 201 g of dimethylolpropionic acid, and 0.2 g concentrated sulfuric acid and heated to 140° C. under a nitrogen purge. After 30 minutes at the reaction temperature, the nitrogen purge was stopped and a vacuum was applied. After one hour at these conditions, the vacuum was stopped and the nitrogen purge reinstated. An additional 402 g of dimethylolpropionic acid were added to the reactor. After one hour and 30 minutes at the reaction temperature, the nitrogen purge was stopped and a vacuum was applied. After one hour and 30 minutes at these conditions, the vacuum was stopped and the nitrogen purge reinstated. The reactor was cooled to 115° C. and 65.4 g of xylene were added. The mixture was stirred for 30 minutes while cooled and poured off.

Gel permeation chromatography (GPC) results (polystyrene standard) for the mixture after the first addition of dimethylolpropionic acid were $M_n$=520, $M_w$=680, polydispersity (D)=1.31. GPC results for the mixture after the second addition of dimethylolpropionic acid were $M_n$=900, $M_w$=1400, polydispersity (D)=1.54.

A reactor is charged with 111 grams of the ester product, 180 grams of 2,4-tluene diisocyanate, and 50 grams of n-butyl acetate. The mixture is heated to 100° C., then held at this temperture. The reaction is continued until the initial isocyanate content of 6 meq/g is reduced to 3.1 meq/g. Then, 50 g of n-butyl acetate is added, followed by 90 grams of methyl ethyl ketoxime to block the remaining isocyanate groups.

EXAMPLE 2
Polyisocyanate Ester Compound

A 500-milliliter reactor equipped with an agitator, straight reflux condenser, thermometer, and variable heat source was charged with 67 g trimethylolpropane, 201 g of dimethylolpropionic acid, and 0.2 g concentrated sulfuric acid and heated to 140° C. under a nitrogen purge. After 60 minutes at the reaction temperature, the nitrogen purge was stopped and a vacuum was applied. After 45 minutes at these conditions, the vacuum was stopped and the nitrogen purge reinstated. The reactor was cooled to 120° C. and 160 g of xylene were added. The ester reaction product was stirred and cooled for 30 minutes.

A 146-gram portion of the ester reaction product was heated to 45° C., at which temperature 222 g of isophorone diisocyanate was added to the reactor. The addition funnel was flushed with xylene and added to the reactor. A nitrogen purge was introduced and the reactor temperature was increased to 85° C. The initial isocyanate content was 4.3 milliequivalent per gram of the mixture. After approximately 12 hours at these reaction conditions, the isocyanate number was measured as 3.0 meq/gram. Next, 30 g. of N-methyl pyrrolidinone (NMP) was added and the reaction temperature increased to 100° C. After approximately 5 hours, an additional 55 g. of NMP was added to the mixture. The isocyanate number was measured at 2.4 meq/g.

EXAMPLE 3
Preparation of Blocked Polyisocyanate Ester Product

The product of Example 2 was heated to 100° C. and then reacted with 122.6 grams of methyl ethyl ketoxime. The reactor was cooled to 70° C. The isocyanate meq/g was measured as 0.05.

Coating Examples

Clearcoat compositions were prepared with and without the blocked polyisocyante ester product of Example 2 as shown in the following table. The components were mixed and the viscosity was adjusted with n-butyl acetate to spray viscosity. The coating compositions were then sprayed over basecoated and primed steel panels. The application of the clearcoat over the basecoat layer was wet-on-wet. The applied coating composition was allowed to flash, then the coated panels were baked at 130° C. for 30 minutes.

The cured coatings were tested for extent of cure and scratch resistance. The extent of cure was measured by methyl ethyl ketone double rubs. The number of double rubs to produce marring of the coating was recorded, with the test being stopped at 200 double rubs. (No marring at the end of the test was recorded as >200.) The scratch resistance was measured by the number of methyl ethyl ketone double rubs, in increments of 25, needed to soften the film before a nail with a sharp end could scratch the coating. The scratch resistance test was repeated after the coated panel had aged for one week.

|  | Comparative Example A | Example 4 | Example 5 | Comparative Example B | Example 6 | Example 7 |
|---|---|---|---|---|---|---|
| Acrylic 1[1] | 185 | 185 | 185 |  |  |  |
| Acrylic 2[2] |  |  |  | 170 | 170 | 170 |
| Polyisocyanate 1[3] | 87.5 | 87.5 | 65.6 |  |  |  |
| Polyisocyanate 2[4] |  |  |  | 85 | 85 | 64 |
| Example 2 |  | 20 | 40 |  | 18 | 36 |
| MEK double rubs | 200 | >200 | >200 | 200 | >200 | >200 |
| Scratch (initial) | 50 | >125 | >125 | 75 | 75 | 100 |
| Scratch (1 week) | 125 | >200 | >200 | >200 | >200 | >200 |

[1]Acrylic polymer with equivalent weight of 392 grams per hydroxyl equivalent.
[2]Acrylic polymer with equivalent weight of 360 grams per hydroxyl equivalent.
[3]Blend of 37% of the isocyanurate of hexamethylene diisocyanate and 63% of the isocyanurate of isophorone diisocyanate.
[4]Blend of 75% of the isocyanurate of hexamethylene diisocyanate and 25% of the isocyanurate of isophorone diisocyanate.

The invention has been described in detail with reference to preferred embodiments thereof. It should be understood, however, that variations and modifications can be made within the spirit and scope of the invention.

What is claimed is:

1. A polyisocyanate ester compound having at least two ester linkages, at least four urethane linkages further from the center of the compound compared to the ester linkages, and at least one terminal isocyanate group for each urethane linkage, which isocyanate group may be blocked or unblocked.

2. A polyisocyanate ester compound according to claim 1, wherein the isocyanate groups are unblocked.

3. A polyisocyanate ester compound according to claim 1, wherein the isocyanate groups are blocked.

4. A polyisocyanate ester compound according to claim 3, wherein the isocyanate groups have been blocked using a member selected from the group consisting of lower monohydric alcohols, C—H-acidic compounds, oximes, secondary aromatic amines, lactams, phenolic compounds, amides, N-alkyl amides, imides, imidazoles, triazoles, alkali metal bisulphites, mercaptans, and pyrazoles.

5. A polyisocyanate ester compound according to claim 1, wherein the compound has at least four ester linkages between any two urethane linkages.

6. A polyisocyanate ester compound according to claim 1, wherein the compound has at least about six ester linkages between any two urethane linkages.

7. A polyisocyanate ester compound according to claim 1, wherein the compound has from about 6 to about 12 terminal isocyanate groups.

8. A polyisocyanate ester compound prepared by a process comprising steps of:
   (a) reacting a polyol compound having at least two hydroxyl groups with a carboxylic acid compound having one carboxylic acid group and at least two hydroxyl groups to form a hydroxyl-functional ester product and
   (b) reacting the hydroxyl-functional ester product with a polyisocyanate compound at reaction conditions under which only one of the isocyanate groups is substantially reactive with the hydroxyl groups of the ester product.

9. A polyisocyanate ester compound according to claim 8, wherein the polyol compound has at least three hydroxyl groups.

10. A polyisocyanate ester compound according to claim 8, wherein the polyol compound has from about 3 to about 8 hydroxyl groups.

11. A polyisocyanate ester compound according to claim 8, wherein the polyol compound comprises a member selected from the group consisting of trimethylolpropane and pentaerythritol.

12. A polyisocyanate ester compound according to claim 8, wherein the carboxylic acid compound has from about 2 to about 5 hydroxyl groups.

13. A polyisocyanate ester compound according to claim 8, wherein the carboxylic acid compound comprises dimethylolpropionic acid.

14. A polyisocyanate ester compound according to claim 8, wherein more than one carboxylic acid equivalent of the carboxylic acid compound, based on equivalents of hydroxyl of the polyol compound, is reacted in step (a).

15. A polyisocyanate ester compound according to claim 8, wherein step (a) is carried out by first reacting one equivalent of carboxylic acid based on equivalents of hydroxyl of the polyol compound until the reaction is substantially complete to form an initial ester product and then reacting an additional amount of the carboxylic acid compound with the initial ester product to form the hydroxyl-functional ester product of step (a).

16. A polyisocyanate ester compound according to claim 8, having a polydispersity of about 1.3 to about 1.8.

17. A polyisocyanate ester compound according to claim 8, wherein the polyisocyanate compound of step (b) is selected from the group consisting of isophorone diisocyanate, the isomers of toluene diisocyanate, and combinations thereof.

18. A coating composition, comprising:
   (a) a polyisocyanate ester compound having at least two ester linkages, at least four urethane linkages further from the center of the compound compared to the ester linkages, and at least one terminal isocyanate group for each urethane linkage, which isocyanate group may be blocked or unblocked and
   (b) a resin or polymer having functionality reactive with isocyanate groups.

19. A coating composition according to claim 18, wherein the isocyanate groups are unblocked.

20. A coating composition according to claim 18, wherein the isocyanate groups are blocked.

21. A coating composition according to claim 18, wherein the polyisocyanate ester compound has at least four ester linkages between any two urethane linkages.

22. A coating composition according to claim 18, wherein the polyisocyanate ester compound has at least about six ester linkages between any two urethane linkages.

23. A coating composition according to claim 18, wherein the polyisocyanate ester compound has from about 6 to about 12 terminal isocyanate groups.

24. A coating composition according to claim 18, wherein the polyisocyanate ester compound is prepared by steps of reacting a polyol having from about 3 to about 8 hydroxyl groups with a carboxylic acid compound having one carboxylic acid group and from about 2 to about 5 hydroxyl groups to form an ester product, and then reacting the ester product with a polyisocyanate selected from the group consisting of isophorone diisocyanate, the isomers of toluene diisocyanate, and combinations thereof.

25. A coating composition according to claim 18, further including at least one additional polyisocyanate compound selected from the group consisting of diisocyanates, triisocyanates, isocyanurates of diisocyanates, biurets of diisocyanates, allophanates of diisocyanates, and combinations thereof.

26. A coating composition according to claim 25, wherein the combination of the polyisocyanate ester compound and the additional polyisocyanate compound comprises at least about 10% by weight of the polyisocyanate ester compound.

27. A coating composition according to claim 25, wherein the combination of the polyisocyanate ester compound and the additional polyisocyanate compound comprises from about 15% to about 25% by weight of the polyisocyanate ester compound.

28. A coated substrate, comprising a coating layer produced from the coating composition of claim 18.

29. A coated substrate according to claim 28, wherein the substrate is selected from the group consisting of metal substrates and plastic substrates.

30. A coated substrate according to claim 28, wherein the coating layer is a clearcoat coating layer and the substrate is an automotive vehicle body.

* * * * *